(12) United States Patent
Annadurai et al.

(10) Patent No.: US 7,292,607 B2
(45) Date of Patent: Nov. 6, 2007

(54) METHOD AND CIRCUIT FOR PROCESSING DATA IN COMMUNICATION NETWORKS

(75) Inventors: Andy Annadurai, Fremont, CA (US); Chris Tsu, Saratoga, CA (US); Feng Han, Pleasanton, CA (US)

(73) Assignee: Sartre Satire LLC, Las Vegas, NV (US)

( * ) Notice: Subject to any disclaimer, the term of this patent is extended or adjusted under 35 U.S.C. 154(b) by 1085 days.

(21) Appl. No.: 10/067,465

(22) Filed: Feb. 4, 2002

(65) Prior Publication Data

US 2003/0147425 A1   Aug. 7, 2003

(51) Int. Cl.
*H04J 3/06* (2006.01)
*H04L 12/28* (2006.01)

(52) U.S. Cl. ...................... 370/503; 370/907
(58) Field of Classification Search ............. None
See application file for complete search history.

(56) References Cited

U.S. PATENT DOCUMENTS

| | | | | |
|---|---|---|---|---|
| 5,132,991 A | * | 7/1992 | McNesby et al. | 375/368 |
| 5,136,587 A | * | 8/1992 | Obana et al. | 370/535 |
| 5,710,774 A | * | 1/1998 | Suh et al. | 370/513 |
| 6,359,908 B1 | * | 3/2002 | Soda | 370/503 |
| 6,385,213 B1 | * | 5/2002 | Nakamura et al. | 370/513 |
| 6,470,034 B1 | * | 10/2002 | Tan | 370/514 |
| 6,961,348 B2 | * | 11/2005 | Yu | 370/466 |
| 2002/0191640 A1 | * | 12/2002 | Haymes et al. | 370/466 |

* cited by examiner

*Primary Examiner*—Huy D. Vu
*Assistant Examiner*—Roberta A. Shand
(74) *Attorney, Agent, or Firm*—McDonnell Boehnen Hulbert & Berghoff LLP (57) ABSTRACT

A method and circuitry for detecting a pattern in received data such as the A1A2 boundary in a SONET frame after deserialization. Two consecutive pluralities of bytes of incoming data are stored and compared with the A1 and A2 values (or bit shifted versions of the A1 and A2 values) until the boundary is detected. The data are then bit shifted so that every byte on the bus is either A2 or A1. A new aligned data bus is then formed such that the last A1 bit occurs on the data bus for a given clock cycle and the first A2 bit occurs on the data bus during the next clock cycle.

34 Claims, 10 Drawing Sheets

METHOD AND CIRCUIT FOR PROCESSING DATA IN COMMUNICATION NETWORKS

BACKGROUND OF THE INVENTION

The invention relates to the field of data processing in communications networks and more specifically to a method and circuit for detecting standard patterns in data such as those found in header bytes SONET-based telecommunication systems.

Figure 7:
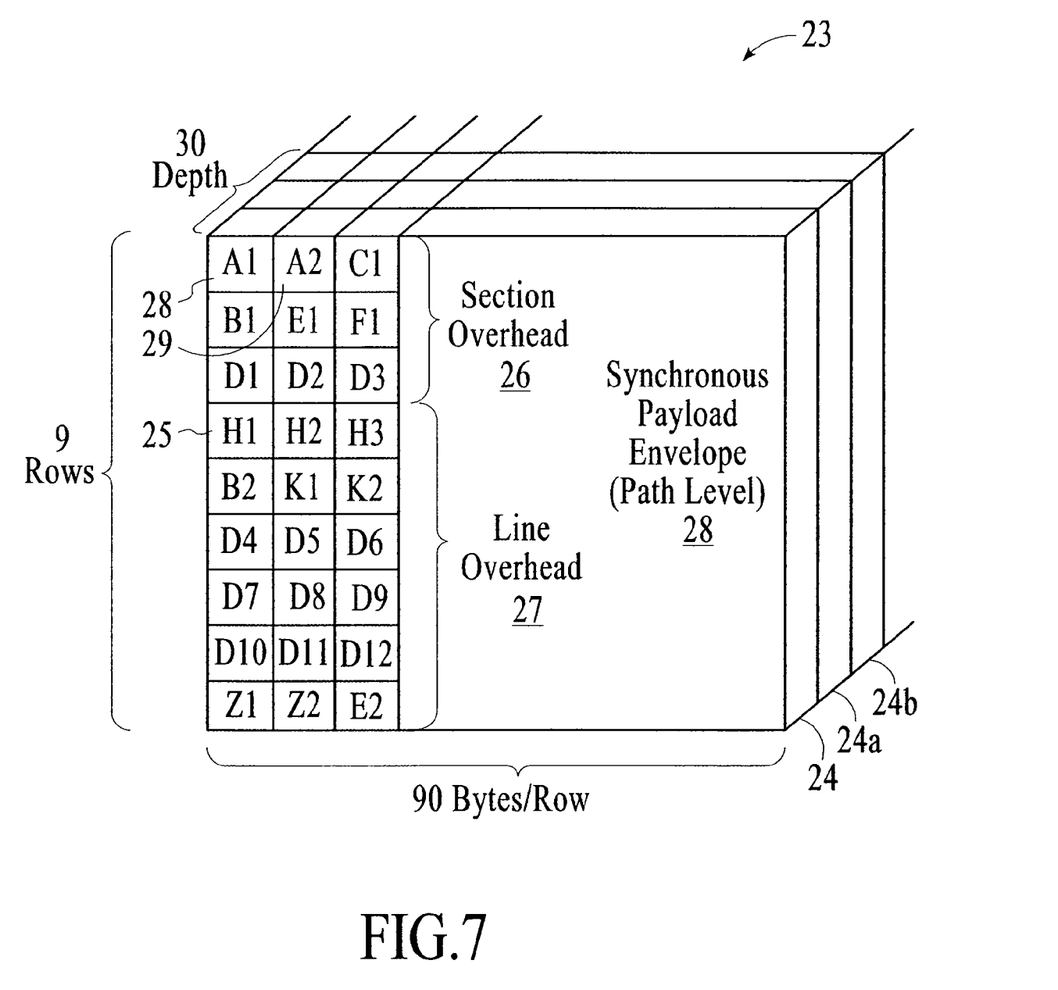
FIG. 7 shows a graphical depiction of an OC-N SONET frame.

In some telecommunication systems, data is transmitted with a predetermined structure called the frame. The frame typically contains a header (or overhead) section where information about the particular frame resides, and a payload section where the actual data resides. Different data transmission protocols may required different data frame. For example, SONET (Synchronous Optical Network) which is a transmission multiplexing standard for high-speed data communications within North America, has as its basic building block a 51.84 Mb/s, OC-1 (Optical Carrier 1) frame. The organization of an OC-1 frame 24 is depicted in FIG. 7. The structure of the OC-1 frame 24 can be thought of as a two dimensional matrix having nine rows 25 with each row 25 containing 90 bytes of data. The frame's data is transmitted row by row, from left to right with the most significant bit (MSB) of each byte being transmitted first. The first three columns of each frame form the header section that is divided between section overhead 26 and line overhead 27 as shown. The remainder of the frame carries the synchronous payload envelope (SPE) 28 containing the data. The section overhead 26 includes a series of named bytes. Two of the named bytes, A1 and A2 signal the start of the OC-1 frame. According to the SONET standard, the A1 byte has a value F6 in hexadecimal (1111_0110 in binary) and the A2 byte has a value of 28 (0010_1000 in binary).

To achieve high data rates, multiple frame-aligned OC-1 signals are multiplexed to form a higher frequency OC-N signal. FIG. 7 shows an OC-N signal 23 which is made up of N OC-1 frames (24, 24a, 24b, etc.). The OC-N signal 23 allows the system to operate at a frequency of (N)×(51.84 Mb/s). As shown in FIG. 7, the OC-N signal 23 can be viewed as a three dimensional frame having a depth of N tiers, each of which is an OC-1 frame 24. In SONET, data is transmitted serially with the sequence of byte transmission indexed first by tier depth N then by row then by column. So the A1 byte of OC-1 frame 24 would be transmitted first, followed by the A1 byte of OC-1 frame 24a, followed by the A1 byte of OC-1 frame 24b, etc. After the A1 bytes of all N OC-1 frames are transmitted, the sequence steps along the row, and the A2 bytes of the OC-1 frames, 24, 24a, 24b, etc. are transmitted. The beginning pattern for an OC-N SONET signal is thus N consecutive A1 bytes (A1=F6) followed by N consecutive A2 bytes (A2=28). This distinctive sequence must be detected by a SONET receiver in order to distinguish the start of an OC-N frame.

At the receiver end, the serial SONET data is first deserialized from a serial bitstream onto a multiple-bit (e.g., 16 bit) wide parallel data bus by a SERDES (Serializer/Deserializer) chip. The 16 bit wide bus is then further deserialized into a 128-bit wide parallel bus for data processing in an OC-N framer chip. Since data arrives from the optical fiber as a serial bitstream, the data on the 128 bit bus, after the two deserializing steps, may not fall on the A1A2 boundary. A method is needed to rearrange the data and align it in such a way that the data aligns along the A1A2 boundary.

Several methods of accomplishing this data alignment are known in the art. For example, one known method compares the 128 bits of data on the data bus with A1 and A2 directly. As the A1A2 boundary can fall on any of the 128 bits, detecting the A1A2 boundary in one clock cycle according to this method requires 128, 128-bit comparators. The circuitry needed to accomplish detection of the A1A2 boundary according to this method is too large to be commercially practicable. Assuming state of the art 0.18 micron process technology, a single 128 bit comparator has about 4,500 unit cells. Implementation of 128 such comparators would thus require 756,000 unit cells. Realignment by this method would also require 128, 128-to-1 multiplexers, each of which requires 3,000 unit cells to implement. The total unit cell cost of the known direct comparison method is 1,100,000 unit cells, which is quite expensive.

An alternative method requires only one 128-bit comparator which directly compares the 128-bit data bus with A1 and A2. In order to cover all possible locations of the A1A2 boundary, this second method shifts the 128-bit register one bit between every comparison until the boundary is found. This method has the advantage of requiring much less circuitry to implement, but requires potentially 128 clock cycles to detect the A1A2 boundary. Such a long delay is not acceptable in real time data processing.

A third method for detecting the A1A2 boundary moves the detection logic one level closer to the line level. If detection can be performed at the input to the OC-N framer, on a 16-bit wide bus, unit cell savings can be realized. The shortcoming with this method is that the comparison has to be made at a much higher clock frequency (622 MHz), which is a difficult timing requirement to meet.

What is needed is a method and circuitry for detecting data patterns such as the A1A2 boundary in an OC-N SONET frame using a small number of clock cycles and minimal circuit overhead.

BRIEF SUMMARY OF THE INVENTION

The present invention provides methods and circuitry for detecting standard patterns in received data such as the A1A2 boundary in a SONET frame. In a specific embodiment, the present invention detects the SONET frame A1A2 boundary and realigns the data along the A1A2 boundary in as little as five clock cycles with a minimum of logic circuitry.

A method according to embodiments of the present invention detects the A1A2 boundary by monitoring half the bytes on a data bus for two consecutive clock cycles. The boundary is detected if all of the monitored bytes for the first cycle equal A1*, which is A1 or any bit shifted value thereof, and all of the monitored bytes for the subsequent cycle equal A2*, which is A2 or any bit shifted value thereof. Aspects of the present invention provide for storing the first set of data bus values in a first data register to facilitate the comparison. Another aspect of the invention allows detection of the A1A2 boundary on a 128-bit bus. Additional aspects of the invention enable detection of the A1A2 boundary in any OC-N SONET frame. Other aspects of the invention allow for detection of the A1A2 boundary by monitoring 8 bytes on the data bus per clock cycle.

A method according to the present invention is provided for bit shifting SONET data on a data bus such that each byte on the shifted bus equals either A1 or A2. Other aspects of the present invention apply the bit shifting method to a 128-bit wide data bus. In some aspects of the present invention, 8 bytes of data on the data bus are compared with predetermined values for each of two clock cycles in order to determine the extent to which the output bus should be bit shifted.

Other aspects of the present invention are provided for byte shifting data on a SONET data bus such that all the bytes of at least one clock cycle are equal to A1 and all the bytes of on the bus during a subsequent clock cycle are all equal to A2.

According to one embodiment of the present invention circuitry for detecting the A1A2 boundary in a SONET frame includes a first data register for storing the values on a SONET data bus and a comparator for comparing some portion of the stored values with a set of predetermined values and for comparing some portion of the data bus values with predetermined values. Other aspects of the present invention provide a bit select output from a comparator, the value of the bit select being determined by the difference between the values of bytes in the first data register and predetermined values. Other aspects of the present invention provide a second data register coupled to the first data register for storing the first data register's values on a subsequent clock cycle.

Other embodiments of the present invention provide a bit shifter for mapping a SONET data bus onto a new bus such that each SONET header byte in the new bus equals either A1 or A2. Other aspects of the present invention provide for the bit shifter to take input from the bit select as well as from the first and second data registers. Another embodiment of the present invention includes a bit shifter realized as an array of multiplexers. Another embodiment of the present invention provides a third data register to store the bit shifted bus and a fourth data register to store the values in the third data register on a subsequent clock cycle.

Alternate embodiments of the present invention shift data on a SONET data bus such that the data are aligned along the A1A2 boundary. Some aspects of the present invention provide a byte selection circuitry that takes input from the third data register to determine the location of the A1A2 boundary with respect to the edge of the SONET data bus. Other embodiments provide that the byte select circuitry outputs a byte select bus. Other aspects of the present invention provide a byte shifter that takes as input the byte select bus as well as the outputs of the third and fourth data register, and outputs a new data bus, byte shifted such that bus data are aligned along the A1A2 boundary. Alternative embodiments of the invention provide a fifth data register to store the aligned bus values prior to output

DETAILED DESCRIPTION OF THE INVENTION

Figure 1:
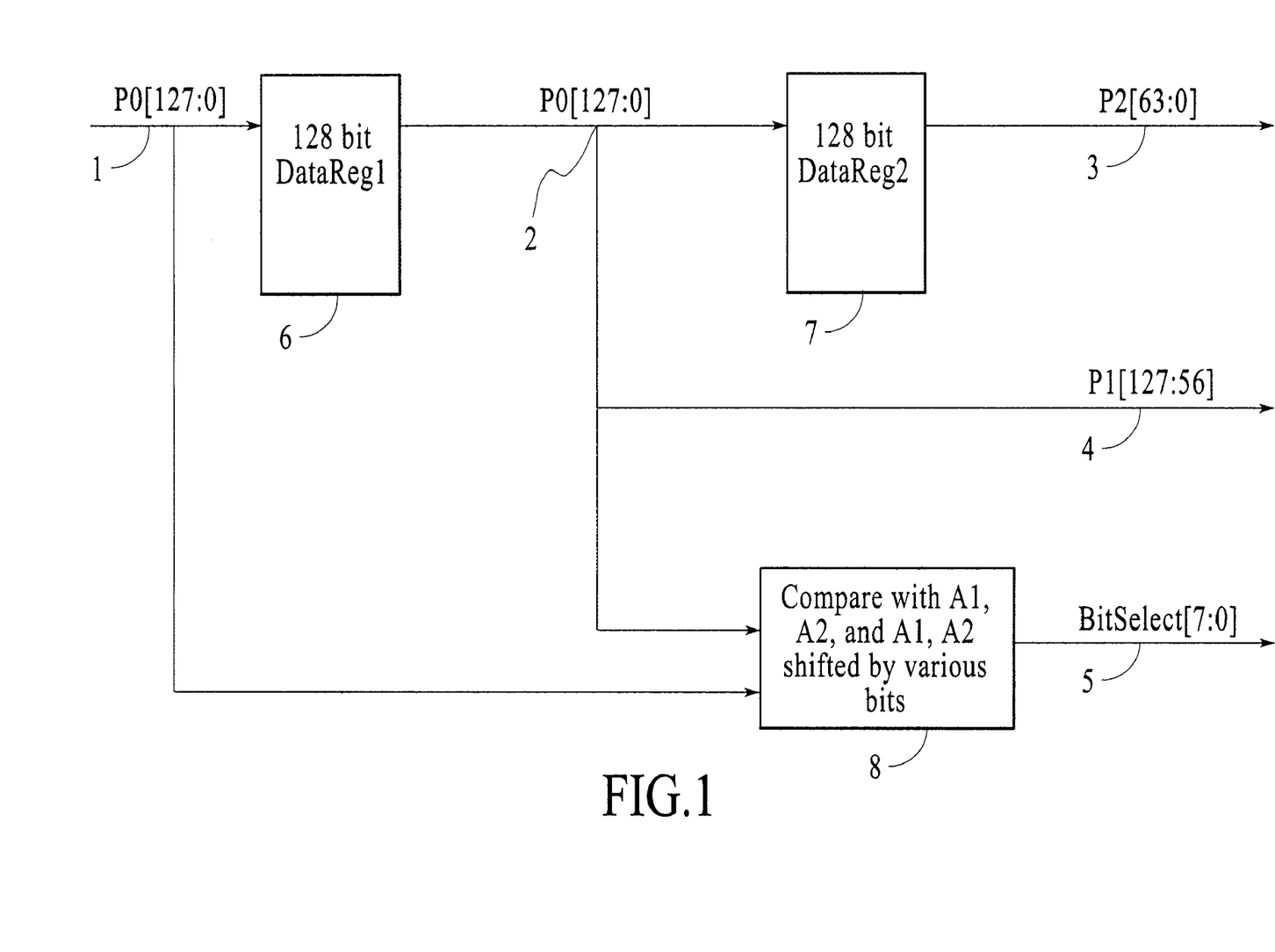
FIG. 1 is a datapath block diagram illustrating an A1A2 boundary detection technique according to an embodiment of the present invention.

Referring to FIG. 1, there is shown a simplified datapath block diagram for detecting the A1A2 boundary in a SONET frame according to one embodiment of the present invention. Serial data P0[127:0] arrives on an input line 1 after having undergone optical-to-electrical conversion. The incoming data P0[127:0] is loaded sequentially into two multi-bit (e.g. 128 bit) data registers, DataReg1 6 and DataReg2 7 as shown. Various specific embodiments of the present invention are described herein in the context of a SONET framer implemented using 128 bit wide bus. It is to be understood, however, that the specific bus width or other implementation-specific values and numbers provided herein are for illustrative purposes only, and that the invention applies to telecommunication systems with other implementations. In the exemplary implementation shown in FIG. 1, each of the registers DataReg1 6 and DataReg2 7 is a 128 bit register accommodating 16 8-bit bytes of data. The registers are designed to store two consecutive 128-bit data with DataReg2 storing the first 128-bit data, and DataReg1 storing the immediately following 128-bit data. Breaking down the data stream into pairs of bytes, the data flow in time at the inputs and outputs of the registers is as follows:

P2[127:112], P2[111:96], P2[95:80], P2[79:64], P2[63:48], P2[47:32], P2[31:16], P2[15:0],

P1[127:112], P1[111:96], P1[95:80], P1[79:64], P1[63:48], P1[47:32], P1[31:16], P1[15:0],

P0[127:112], P0[111:96], P0[95:80], P0[79:64], P0[63:48], P0[47:32], P0[31:16], P0[15:0], where P2[127:112] arrives at the framer's input first, and P0[15:0] arrives at the framer's input last.

Figure 2:
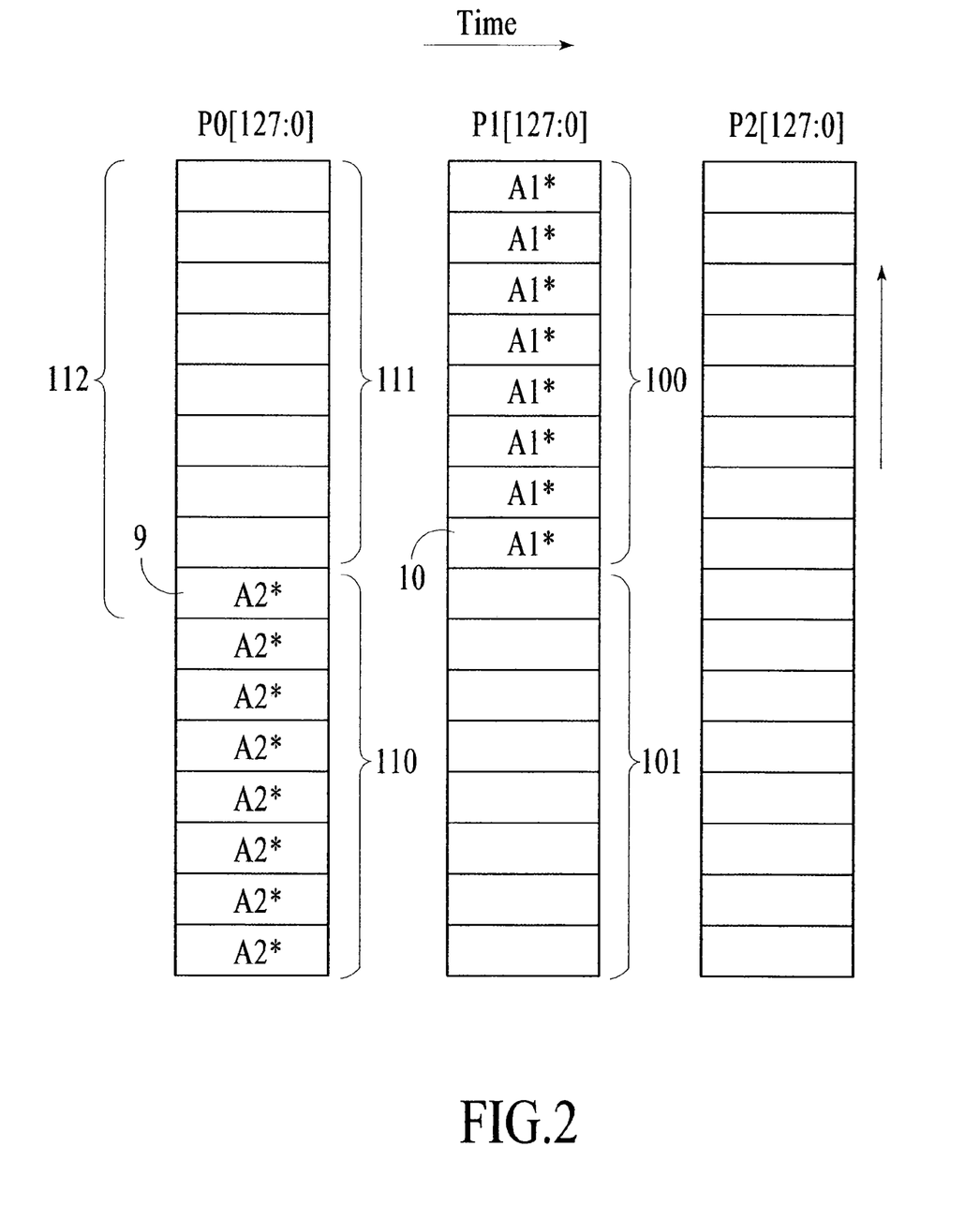
FIG. 2 shows the time varying states of the two data registers of FIG. 1 as well as the contents of the incoming 128-bit data bus.

FIG. 2 provides a depiction of the data flow through the registers in time. A lower block 110 of 64 bits of P0[127:0] data on the data input line 1 is defined by byte number 9 and below, and an upper block 100 of 64 bits of P1[127:0] data is defined by byte number 10 and above, as shown. These 64 bit blocks are designated P0[63:0] 110 and P1 [127:64] 100, respectively. In terms of the sequence of arrival, P1[127:64] 100 arrives first, followed by P1[63:0] 101, followed by P0[127:64] 111, followed by P0[63:0] 110. When the header of an OC-N frame arrives, at some point in time, each byte in P0[63:0] 110 will have a value of A2* and each byte in P1[127:64] 100 will have a value of A1*. A2* is either A2 itself, or A2 bit shifted in binary. A1* is either A1 itself or A1 bit shifted in binary. In the exemplary embodiment described herein, A1* is defined as any of the following binary values: A1 itself: 1111_0110, A1 left shifted 1 bit: 1110_1101, A1 left shifted 2 bits: 1101_1011, A1 left shifted 3 bits: 1011_0111, A1 left shifted 4 bits: 0110_1111, A1 left shifted 5 bits: 1101_1110, A1 left shifted 6 bits: 1011_1101, or A1 left shifted 7 bits: 0111_1011. Similarly, A2* is defined as any of the following binary values: A2 itself: 0010_1000, A2 left shifted 1 bit: 0101_0000, A2 left shifted 2 bits: 1010_0000, A2 left shifted 3 bits: 0100_0001, A2 left shifted 4 bits: 1000_0010, A2 left shifted 5 bits: 0000_0101, A2 left shifted 6 bits: 0000_1010, or A2 left shifted 7 bits: 0001_0100.

When each byte in the block P0[63:0] 110 equals A2* and each byte in the block P1[127:64] 100 equals A1*, the A1A2 boundary must be somewhere among the 136 bits formed by P1[63:0] 101 and P0[127:56] 112. One extra byte is included in this window because of the possibility that A1* and A2* will actually be shifted 7 bits from the A1 and A2 values. According to this embodiment of the present invention, the data in P1[127:64] 100 of the first data register 6 and the data in P0[63:0] 110 of the data input are compared by a comparator 8 (in FIG. 1) with A1* and A2*, respectively. When matches between all 8 bytes in P1[127:64] and A1* and all eight bytes in P0[63:0] and A2* are detected by the comparator, the A1A2 boundary has been detected.

Figure 8:
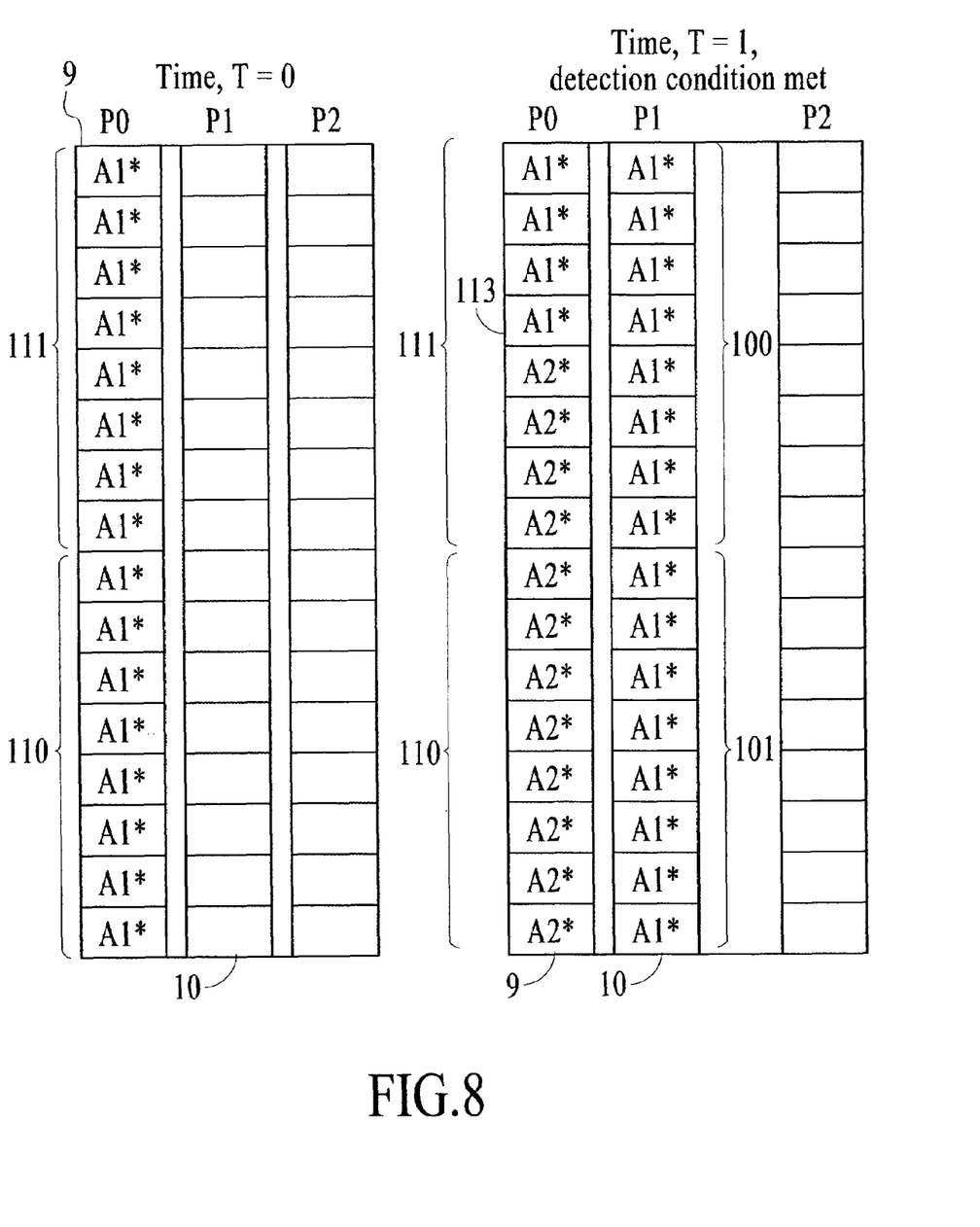
FIG. 8 shows the A1A2 detection method when the A1A2 boundary is in the upper half of the input bus.

FIG. 8 depicts an exemplary condition whereby the A1A2 boundary is detected according to the present invention. There is shown the situation where the A1A2 boundary 113 occurs among the first 64 bits of the 128-bit bus, which is to say, somewhere in P0[127:64]. Referring to FIG. 8, at time T=0, P0[127:0] 9 is composed entirely of A1* bytes. At time T=1, the subsequent clock cycle, the prior P0[127:0] values have been clocked into the first data register and are now represented by P1[127:0] 10. The A1A2 boundary 113 now occurs on the incoming data bus among the block P0[127:64] 111. Under these conditions, detection of the A1A2 boundary 113 occurs at time T=1 since P1[127:64] 100 all equal A1* and P0[63:0] 110 all equal A2*.

Figure 9:
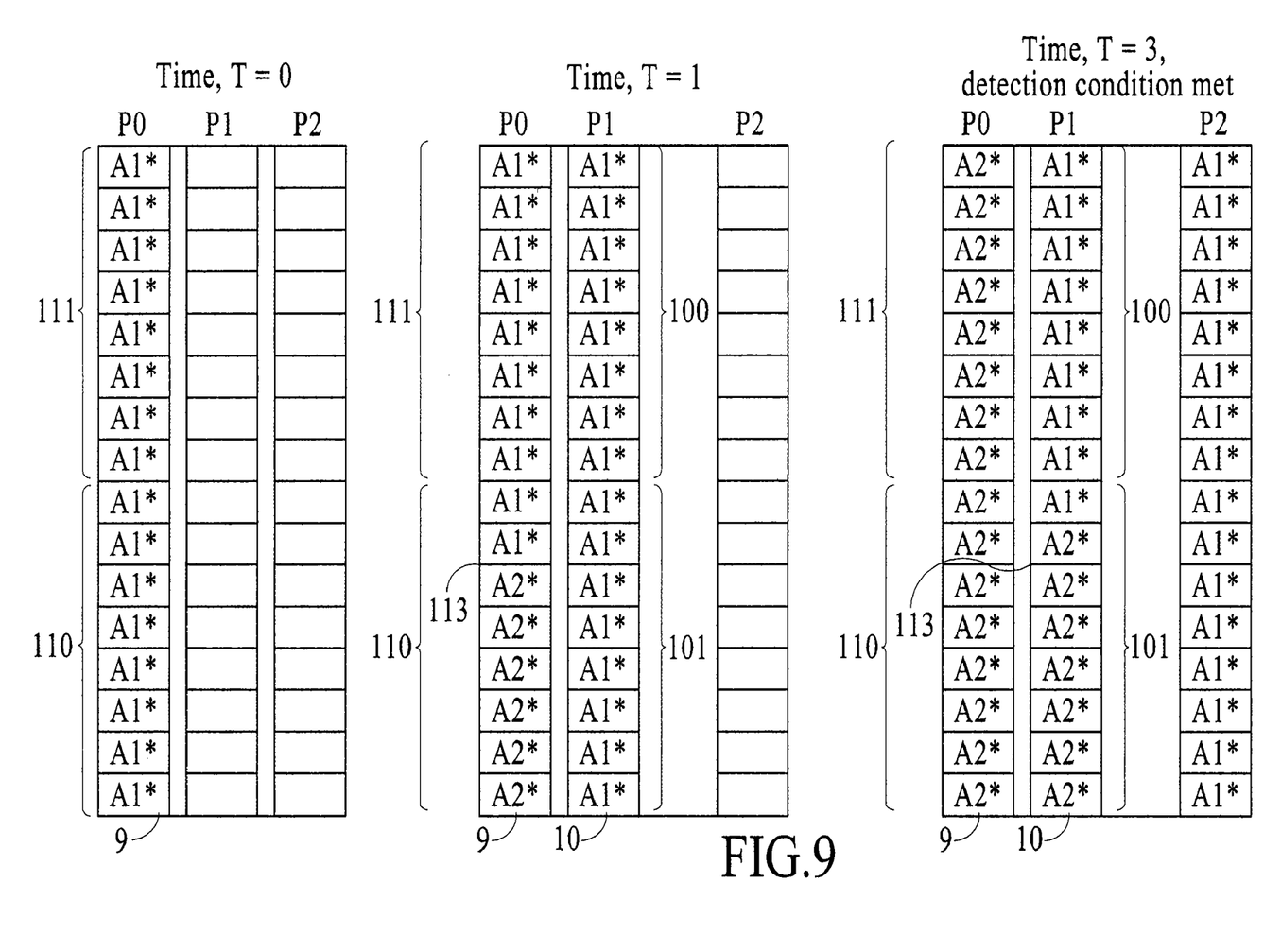
FIG. 9 shows the A1A2 detection method when the A1A2 boundary is in the lower half of the input bus.

FIG. 9 illustrates how the method of the present invention detects the A1A2 boundary when it occurs among the last 64 bits in the data bus, P0[63:0] 110. At time T=0, P0[127:0] 9 is composed entirely of A1*. At time T=1, the subsequent clock cycle, P0[127:0] 9 contains the A1A2 boundary in the last half of the register P0[63:0] 110. At time T=2, the prior values P0 have been clocked into the first data register and are represented by the values P1[127:0] 10. At time T=2, the A1A2 boundary 113 occurs in the lower half of P1 or P1[63:0] 101. When this occurs the blocks of the upper half of P1, P1[127:64] 100 all equal A1* and the blocks of the lower half of P0, P0[63:0] 110 all equal A2*. The detection condition, in this case, occurs after 3 clock cycles rather than in 2, as in FIG. 8.

Referring again to FIG. 1, there is shown a comparator 8 receiving input from the incoming data bus 1 and DataReg1 6 according to the method described above. The comparator compares the values of the lower half of the data input bus P0[63:0] 9 with the values of the upper half of DataReg1 10 with eight bytes of A2* and eight bytes of A1* respectively. In one embodiment of the invention, the comparator is realized by an array of eight 128-bit comparators (not shown). Based on the values of A1* and A2*, the comparator 8 generates output control bits on a bit selection control bus, BitSelect[7:0] 5. These control bits are used to shift the data in each byte, so that the data in each byte is either A1 or A2

Figure 3:
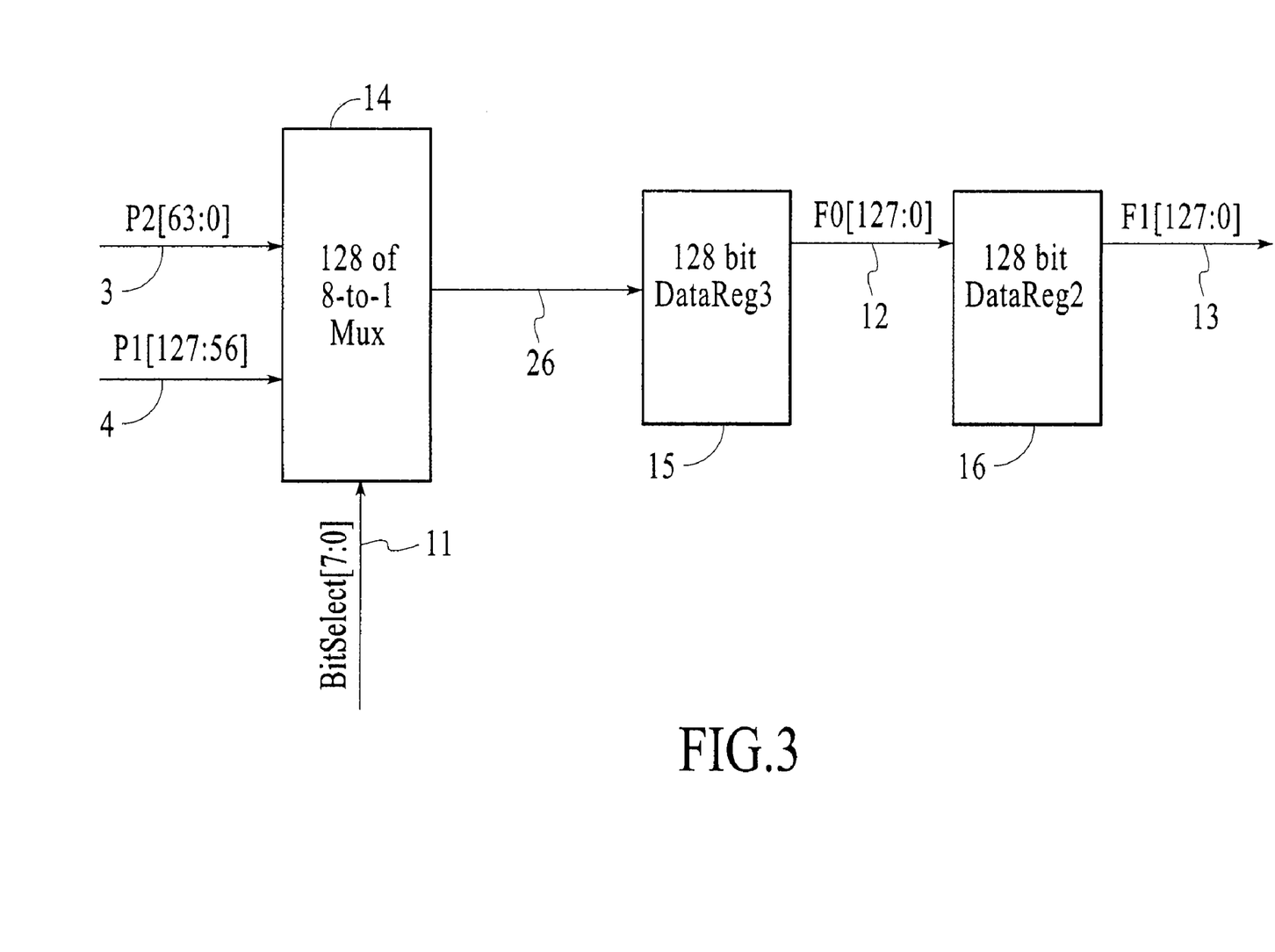
FIG. 3 shows a datapath block diagram of bit realignment of the data bus according an embodiment of the present invention.
Figure 4:
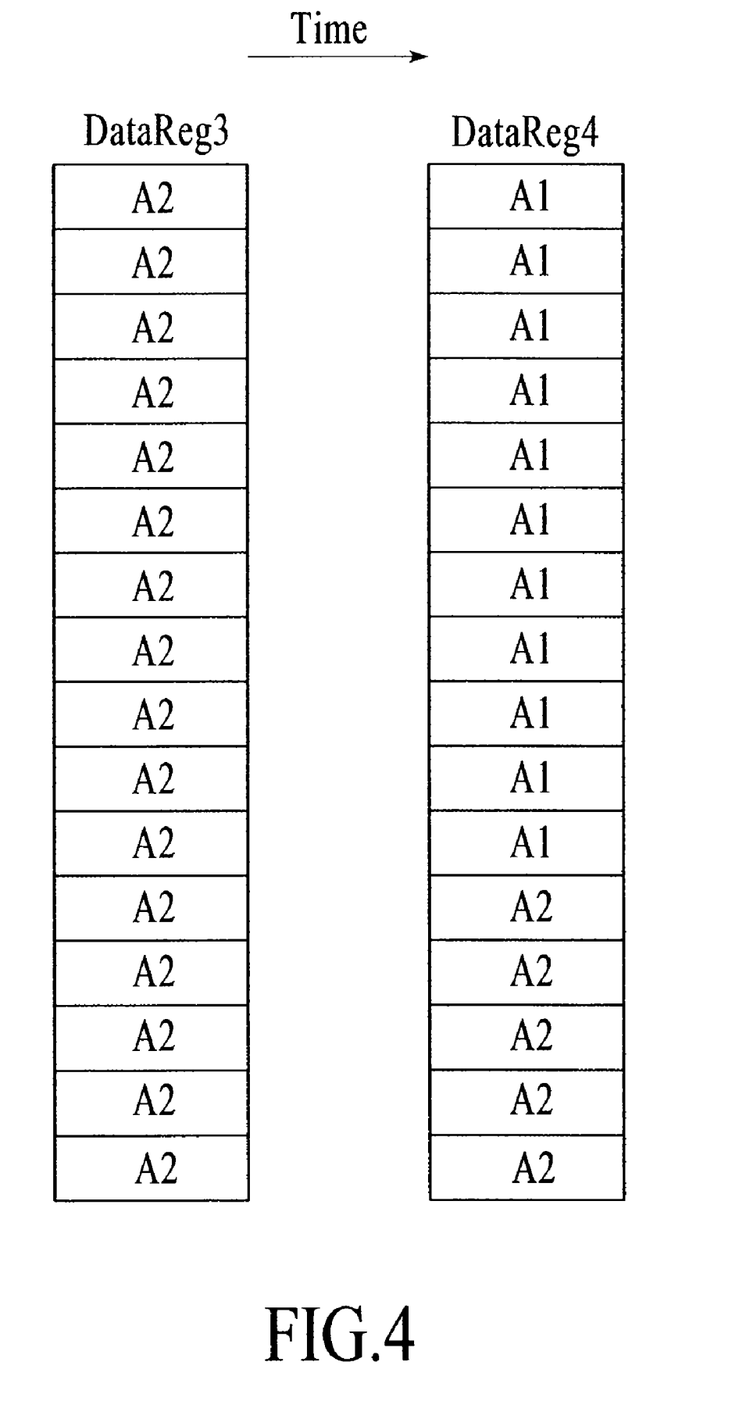
FIG. 4 shows the states of two data registers comprising bit aligned data according to an embodiment of the present invention.

In the method of the invention described above, it was demonstrated that the A1A2 boundary occurs among the 136 bits formed by P1[63:0] 2, and P0[127:56] 1. Since the comparison takes one clock cycle to generate the control signal on BitSelect[7:0] 5, one clock cycle delay is needed to compensate the clock difference between the BitSelect[7:0] and the data bus. In order to realign the data in accordance with the extent of the bit shift, the invention reconfigures P2[63:0] 3 and P1[127:56] 4 to form a single realigned 128 bit long data. FIG. 3 shows in more detail how an exemplary embodiment of the present invention accomplishes the bit alignment of the data. In this example, a multiplexer array 14 includes 128 8-to-1 multiplexers and receives signals P2[63:0] 3 and P1[127:56] 4 at its inputs as shown. These values represent portions of the contents of DataReg1 6 and DataReg2 7 respectively. Together, P2[63:0] 3 and P1[127:56] 4 represent 136 sequential bits from the original serial data stream. Multiplexer array 14 receives the Bit Select[7:0] signal at its select input 11. The control signal BitSelect[7:0] is used to shift the data in the new data bus 26 at the output of the multiplexer array 14. In the exemplary embodiment described herein, the shift amount is from 0 to 7 bits, so that each byte in the 128 bit output data bus 26 is either A1 or A2, as shown in FIG. 4. The multiplexer array 14 thus shifts the data P2[63:0] 3 and P1[127:56] 4 into a third 128-bit register 15 such that each 8-bit block of DataReg3 15 contains only A1 or A2. The shifted data are stored in DataReg3 15 as well as another sequential register, DataReg4 16. The values of these two registers are represented by F0[127:0] 12 and F1[127:0] 13, respectively. The bit alignment step according to this embodiment of the invention requires two clock cycles to complete. The values of DataReg3 and DataReg4 are shown in FIG. 4.

Figure 5:
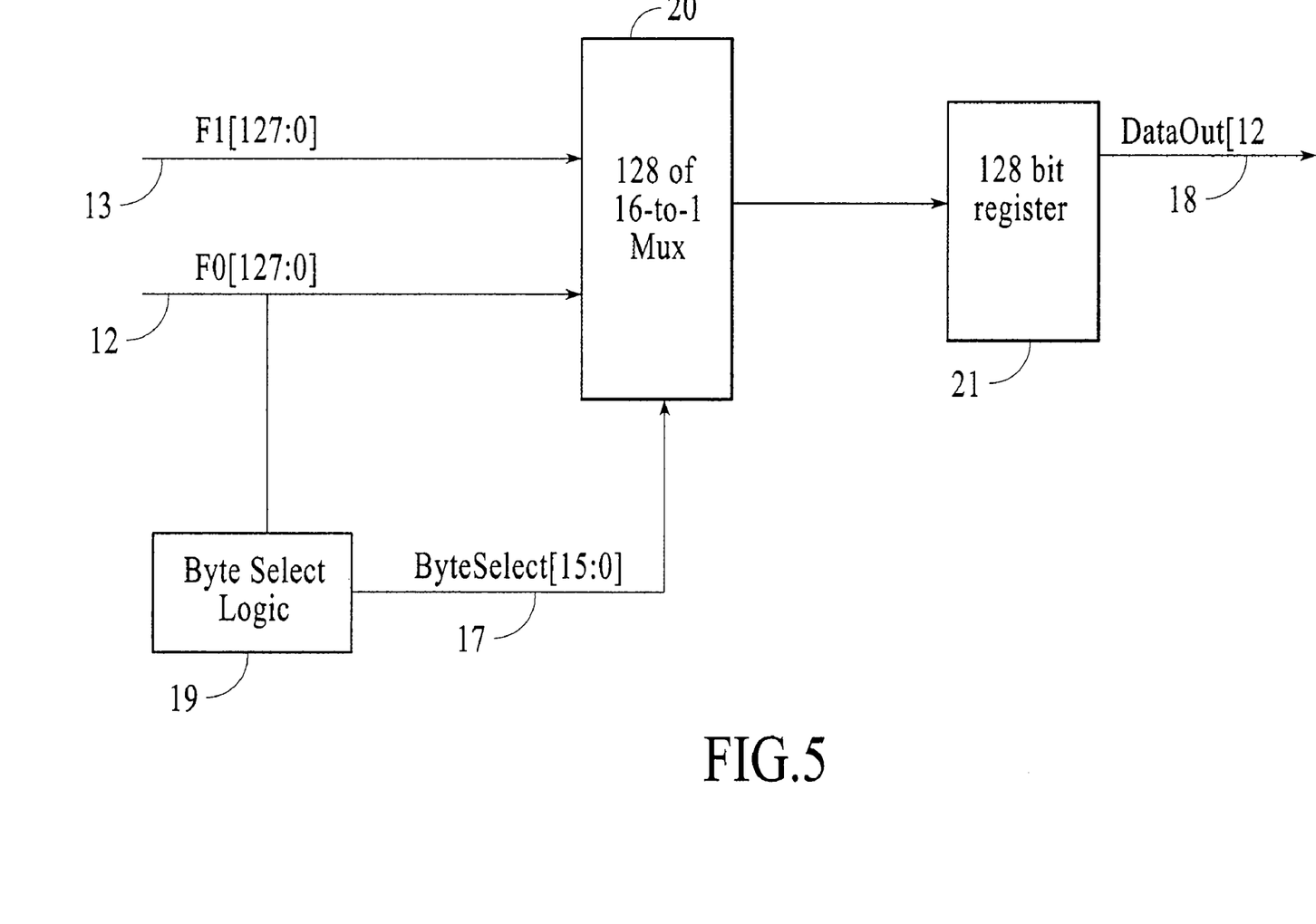
FIG. 5 shows a datapath block diagram of byte realignment according to an embodiment of the present invention.
Figure 6:
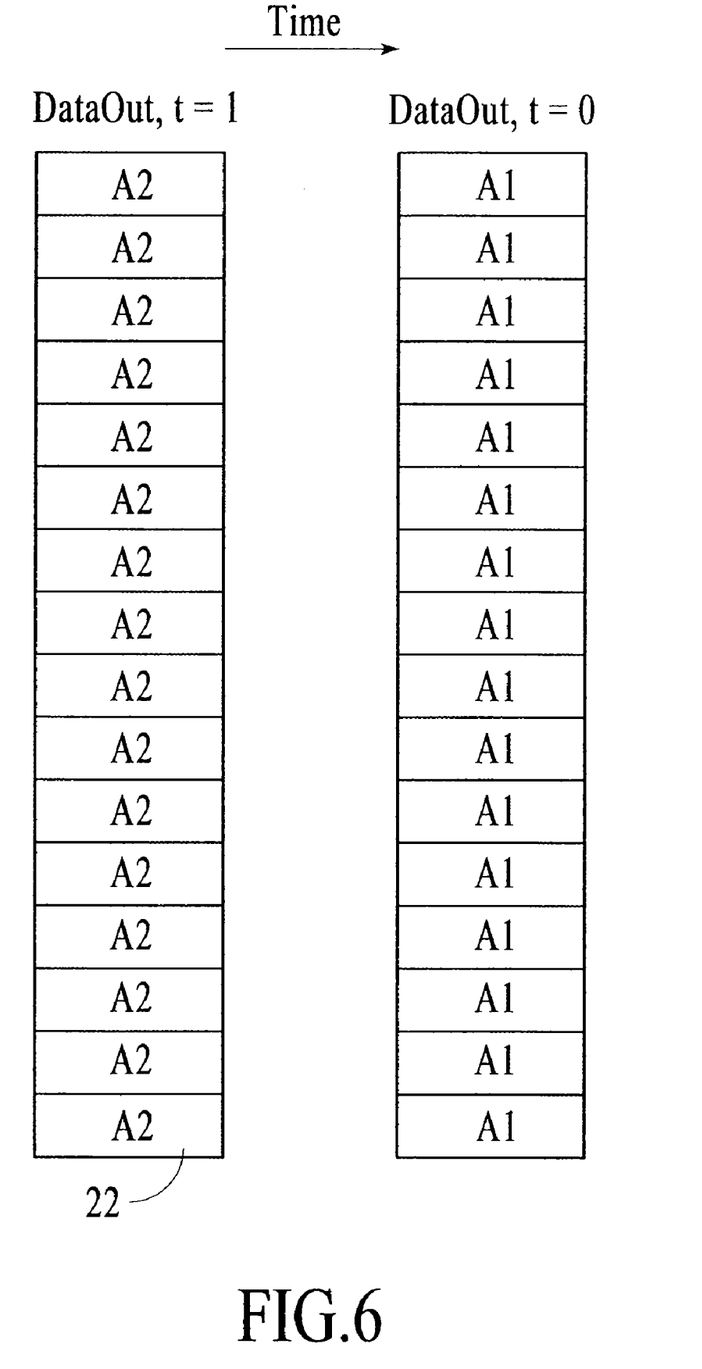
FIG. 6 shows the time varying contents of a data register containing data aligned in accordance to the A1A2 boundary according to an embodiment of the present invention.

The final alignment step in a method according to the present invention, byte shifts the data so that it is aligned along the A1A2 boundary. FIG. 5 shows Byte Select Logic 19, which takes input F0[127:0] 12 from DataReg3 15. The data F0[127:0] 12, is examined to determine the location of the A1A2 boundary, in terms of number of bytes, from the edge of the bus. A 16-bit byte select control signal ByteSelect[15:0] 17 is generated onto bus 17 by the Byte Select Logic 19. FIG. 5 also shows an array 20 of 128 16-to-1 multiplexers accepting both F0[127:0] 12 and F1[127:0] 13 as inputs. The multiplexer array 20 shifts the input data onto an output 128-bit register 21 in accordance with the ByteSelect{15:0] signal on bus 17 such that the output register 21 contains either A1 only or A2 only as is shown in FIG. 6. This final alignment step requires 2 clock cycles to complete.

Figure 10:
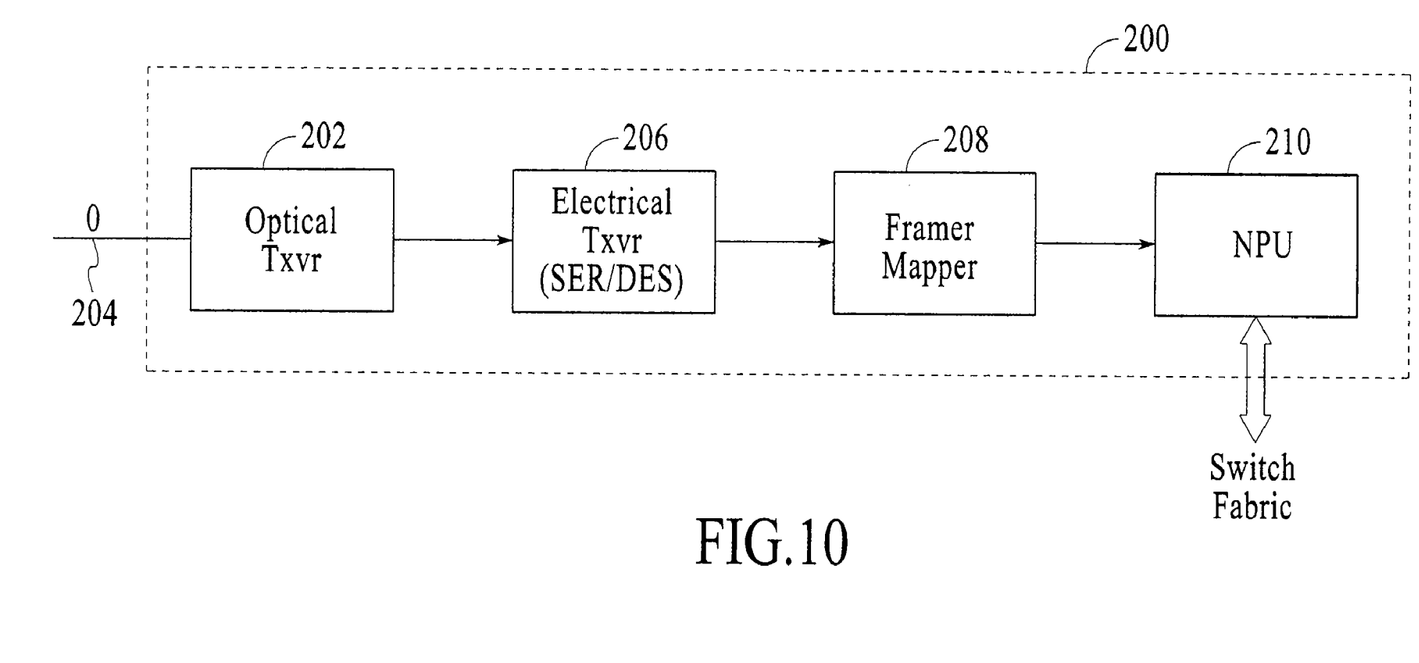
FIG. 10 is a block diagram of a SONET line card with including a framer operating according to an exemplary embodiment of the present invention.

FIG. 10 is a block diagram of a SONET line card 200 that includes a framer implemented according to one embodiment of the present invention. Line card 200 includes an optical transceiver 202 that receives optical data from the fiber channel 204 and converts it to an electrical signal. The output of the optical transceiver 202 connects to an electrical transceiver 206 that performs the SER/DES functionality among others. The deserialized data at the output of electrical transceiver 206 is applied to a framer 208. Framer 208 detects the A1A2 boundary and realigns the data as described above, and forwards it to a network processing unit NPU 210. The NPU 210 interfaces with the switch fabric and performs various functions such as traffic control, protocol conversion and the like.

The SONET line card 200 using the framer 208 according to the present invention has a superior performance due to the speed and efficiency of the framer. The method of the instant invention as applied, for example, to the framer 210 of line card 200, has at least two distinct advantages over prior art methods of aligning data along the A1A2 boundary. First, the method of the present invention as demonstrated in the exemplary embodiment above can accomplish the alignment in as few as five clock cycles. Second, the exemplary implementations of the present method presented herein are far more cost effective in terms of hardware requirements. Simulations have shown that the boundary detector according to the present invention can reduce the amount of circuitry down to as much as only 10% of the logic required by prior art implementations to perform the same function in a similar amount of time.

In conclusion, the present invention provides method and circuitry for detecting a boundary between two bytes of received data. In a specific implementation, the invention detects the A1A2 boundary of a SONET OC-N frame within a reduced number of clock cycles requiring significantly smaller circuitry to implement. While the above provides detailed description of specific embodiments, it is to be understood that various modifications, alternative implementations and equivalents are possible. The scope of the invention should therefore not be limited by the embodiments described above, and should instead by determined by the following claims and their full breadth of equivalents.

What is claimed is:

1. A method for aligning data in a data stream along a boundary between two bytes X1 and X2, the data stream comprising N consecutive X1 bytes followed by N consecutive X2 bytes, the method comprising the steps of:
    storing a first M bytes of data, where M is smaller than N;
    monitoring at least a subsequent second M bytes of data, wherein the first M bytes of data and the second M bytes of data are from sequential segments of the data stream;
    comparing each of said first M bytes to a value X1*, wherein X1* represents X1 or any value resulting from a bit shift of X1;
    comparing each of said second M bytes to a value X2*, wherein X2* represents X2 or any value resulting from a bit shift of X2;
    detecting an X1X2boundary when each of said first M bytes equals X1* and each of said second M bytes equals X2*; and
    aligning the data stream along the detected X1X2 boundary to an extent to which the X1X2 boundary is byte shifted from an end point of the data stream such that said first M bytes are on one side of the X1X2 boundary and said second M bytes are on an opposite side of the X1X2 boundary.

2. The method of claim 1 wherein said first M bytes are stored in a first data register.

3. The method of claim 2 wherein said data register is a 128 bit register.

4. The method of claim 1 wherein the data stream is a portion of a SONET frame.

5. The method of claim 4 wherein X1 is the named byte A1 in a SONET frame section header.

6. The method of claim 5 wherein X2 is the named byte A2 in a SONET frame section header.

7. The method of claim 4 wherein the SONET frame is an OC-N SONET frame, and wherein N represents the number of OC-1 frames multiplexed to form the OC-N frame.

8. The method of claim 1 wherein M is substantially equal to half of N.

9. A method of aligning data on a data bus along a boundary between two bytes X1 and X2, the values on the data bus resulting from writing consecutive groups of N bytes from a serial data stream, the serial data stream comprising at least N consecutive X1 bytes followed by at least N consecutive X2 bytes, the method comprising the steps of:
    storing at least a first set of bus values in a first register;
    monitoring the subsequent second set of bus values;
    comparing at least the first M bytes of the first register to the value X1*, where X1* represents X1 or any value resulting from a bit shift thereof comparing at least the last M bytes of the subsequent set of bus values to a value X2*, where X2* represents X2 or any value resulting from a bit shift thereof
    if each of the first M bytes equals X1* and each of the second M bytes equals X2*, determining the extent to which X1and X2 are respectively bit shifted from X1* and X2*, and
    based on the extent of the bit shift, shifting the bus data in a third register such that mapping the data bus into a second register such that the extent of the bit shift is compensated.

10. The method of claim 9 wherein the data bus is a 128 bit wide data bus.

11. The method of claim 10 wherein the data registers are 128 bit wide registers.

12. The method of claim 9 wherein the data stream is at least some portion of a SONET frame.

13. The method of claim 12 wherein X1 is the named byte A1 in a SONET frame section header.

14. The method of claim 12 wherein X2 is the named byte A2 in a SONET frame section header.

15. The method of claim 12 wherein the SONET frame is an OC-N SONET frame, and wherein N represents the number of OC-1 frames multiplexed to form the OC-N frame.

16. The method of claim 9 wherein M is substantially equal to half of N.

17. The method of claim 9 further comprising the steps of:
    determining the extent to which the data bus is byte shifted with respect to the X1X2 boundary,
    and mapping the data bus into a third register such that the third register contains either all X1 values or all X2 values at any point in time.

18. A SONET data processor comprising:
    a first register coupled to an input SONET data bus;
    a comparator having at least a first input directly coupled to the input data bus and a second input directly coupled to the first register such that the comparator has substantially simultaneous access to paralleled data associated with two successive clock cycles,
    wherein the comparator compares the first values in some portion of the input data bus with a predetermined value,
    wherein the comparator compares the second values in some portion of the first register with a predetermined value, and
    wherein said first values in some portion of the input data bus and said second values in some portion of the first register are from sequential segments of a deserialized data stream.

19. The SONET data processor of claim 18 further comprising:
    a bit select bus outputted by said comparator whose value is determined by the difference between the values in some portion of the input data bus and a predetermined value, and the difference between some portion of the first register with a predetermined value.

20. The processor of claim 19 further comprising:
    a second register coupled to said first register wherein the second register stores the values stored in the first register during a prior clock cycle.

21. The processor of claim 20 further comprising:
    a bit shifting circuit having at least three inputs and one output, the first input coupled to receive some portion of the first register's output, the second input coupled to receive some portion of the second register's output, the third input coupled to receive the bit select bus, and the output coupled to generate a new data comprising bit shifted data wherein each of the bytes in the new data has a value equal to a predetermined value.

22. The processor of claim 21 wherein the bit shifting circuit comprises an array of multiplexers.

23. The processor of claim 21 further comprising a third register having at least one input coupled to the output of the bit shifting circuit, and an output.

24. The processor of claim 23 further comprising a fourth register having at least one input coupled to the output of the third register,
wherein the fourth register stores the values stored in the third register during a prior clock cycle.

25. The processor of claim 24 further comprising byte shifting logic having at least one input coupled .to the output of the third register, and adapted to determine the difference between the value of the third register and a predetermined value, and to output a byte select control signal whose value is determined in accordance with said difference.

26. The processor of claim 25 further comprising a byte shifting circuit having a first input coupled to receive the value of the third register, a second input coupled to receive the value of the fourth register, a third input coupled to receive the byte select control signal, and an output coupled to generate a new data whose value for at least one clock cycle is equal to a predetermined value.

27. The processor of claim 26 wherein the byte shifting circuit comprises an array of multiplexers.

28. The processor of claim 26 further comprising an output data register having at least one input coupled to the output of the byte shifting circuit.

29. A SONET line card comprising:
an optical transceiver coupled to receive an optical signal and to convert the optical signal to an electrical signal;
an electrical transceiver coupled to receive the electrical signal and to deserialize the electrical signal into a plurality of parallel data streams;
a framer coupled to the electrical transceiver and configured to detect an A1A2 boundary of the electrical signal; and
a network processing unit coupled to the framer, wherein the framer comprises the SONET data processor of claim 18.

30. A method for data in a data stream associated with a SONET frame, the method comprising:

receiving first and second consecutive N bytes of data, wherein the first N bytes of data and the second N bytes of data are from sequential segments of a data stream;
comparing N/2 consecutive bytes of the first N bytes of data with a first predetermined pattern defined by the A1 byte in a SONET frame header;
comparing N/2 consecutive bytes of the second N bytes of data with a second predetermined pattern defined by the A2 byte in a SONET frame header;
if a match is found in both compare steps, forming a third consecutive N+1 bytes by combining the two N/2 consecutive bytes of data plus one additional byte;
shifting data bits in each byte of the third consecutive N+1 bytes so that each byte corresponds to an A1 or an A2 byte;
detecting a A1A2 boundary in the SONET frame;
determining the extent to which the A1A2 boundary is shifted with respect to an end position of the data stream; and
shifting the A1 and A2 bytes with respect to the extent to which the A1A2 boundary is shifted to align N consecutive bytes along the A1A2 boundary in the SONET frame.

31. The method of claim 30 wherein the N/2 consecutive bytes of the first N bytes comprises the first half of the first N bytes, and the N/2 consecutive bytes of the second N bytes comprises the second half of the second N bytes.

32. The method of claim 30 wherein the N/2 consecutive bytes of the first N bytes comprises the second half of the first N bytes, and the N/2 consecutive bytes of the second N bytes comprises the first half of the second N bytes.

33. The method of claim 30 wherein the first predetermined pattern comprises the A1 pattern or any bit shifted version thereof.

34. The method of claim 33 wherein the second predetermined pattern comprises the A2 pattern or any bit shifted version thereof.

* * * * *

UNITED STATES PATENT AND TRADEMARK OFFICE
CERTIFICATE OF CORRECTION

| | | |
|---|---|---|
| PATENT NO. | : 7,292,607 B2 | Page 1 of 1 |
| APPLICATION NO. | : 10/067465 | |
| DATED | : November 6, 2007 | |
| INVENTOR(S) | : Andy Annadurai, Chris Tsu and Feng Han | |

It is certified that error appears in the above-identified patent and that said Letters Patent is hereby corrected as shown below:

In the claims:

Claim 1, col. 7, line 29, delete "X1X2boundary" and substitute therefore --X1X2 boundary--.

Claim 9, col. 7, line 64, delete "thereof comparing" and substitute therefore --thereof; comparing--.

Claim 9, col. 7, line 67, delete "thereof" and substitute therefore --thereof;--.

Claim 9, col. 8, line 4, delete "X2*," and substitute therefore --X2*;--.

Claim 25, col. 9, line 12, delete "coupled .to" and substitute therefore --coupled to--.

Claim 30, col. 9, line 41, delete "for data" and substitute therefore --for aligning data--.

Signed and Sealed this

Ninth Day of February, 2010

David J. Kappos
*Director of the United States Patent and Trademark Office*